US005616388A

United States Patent [19]

Tatsuno et al.

[11] Patent Number: 5,616,388

[45] Date of Patent: Apr. 1, 1997

[54] WATER REPELLENT COATING

[75] Inventors: Tadayoshi Tatsuno, Hiratsuka; Mitsuo Wakimoto, Isehara; Seiji Kashiwada, Fujisawa, all of Japan

[73] Assignee: Kansai Paint Company, Ltd., Amagasaki, Japan

[21] Appl. No.: 440,372

[22] Filed: May 12, 1995

[51] Int. Cl.$^{6}$ .................................................. B32B 27/00

[52] U.S. Cl. .......................... 428/421; 427/409; 427/421; 427/435; 428/422; 428/463; 428/520

[58] Field of Search ................................ 427/409.1, 409, 427/410, 412.1, 421, 435; 428/421, 422, 463, 520

[56] References Cited

U.S. PATENT DOCUMENTS 4,556,589 12/1985 Neumann et al. .................. 428/522 X 4,871,591 10/1989 Sugimura et al. .................. 427/409 X

OTHER PUBLICATIONS

Japanese Patent application Kokai No. (Laid-Open) 93225/1994.

*Primary Examiner*—Michael Lusignan

*Attorney, Agent, or Firm*—Donald W. Huntley

[57] ABSTRACT

A process for formation of a water repellent coating which comprises applying a topcoat coating composition of a fluorine containing thermosetting resin and granular compound of 5 microns or less in mean particle size to a substrate bearing a thermosetting undercoat coating film which is semi crosslinked, and then co-curing both films by heating. The resulting cured coating has a water repellent surface, excellent adhesion to a substrate, excellent corrosion resistance, no staying of water as droplets on the surface and no foul odor. The coating is especially suitable for applying to aluminum fins of a heat exchanger.

12 Claims, No Drawings

WATER REPELLENT COATING

BACKGROUND OF THE INVENTION

1. Field of the Invention

This invention relates to a process for formation of a water repellent coating film which is suitable for applying, for example, to the fins of a heat exchanger. The present invention further relates to the resulting coated substrates.

2. Description of the Prior Art

Compositions capable of forming a water repellent coating have previously been proposed which comprise fluorine containing thermosetting resin in which the fluorine atom content is 10% or more by weight and granular compound of 5 microns or less in mean particle size. Such compositions are described in Japanese Patent application Kokai (Laid-Open) No. 93225/1994.

The coatings resulting from the compositions mentioned above possess excellent water repellency due to the high contact angle of water droplets compared to that from fluorine containing polyolefin such as poly(tetrafluoroethylene). However, since it is necessary to add 40–200 parts by weight of the granular compound based on 100 parts by weight of the fluorine containing thermosetting resin composition in order to provide a contact angle of water droplets of 150 degrees or more, the resulting coating is inferior in mechanical strength or adhesion when coated directly to a substrate and cured. When the coating is in the form of a paint, it can often be removed from the substrate by rubbing with fingers or peeling adhesive tape from the surface of the paint film. A coating composition with low adhesion would also not be desirable for application to the fin of a heat exchanger which is apt to suffer constant vibrations.

SUMMARY OF THE INVENTION

The present invention provides a process for formation of a water repellent coating on a substrate which results in excellent adhesion to the substrate and has high contact angle of water droplets on the surface.

The present process comprises applying a specific water repellent thermosetting topcoat coating composition to a thermosetting undercoat surface having specific range of gel fraction, and co-curing the topcoat and the undercoat.

Specifically, the present invention provides a process for formation of a water repellent coating which comprises applying a thermosetting undercoat to a substrate; curing the undercoat to a gel fraction of about 20–80%; applying to the undercoat a topcoat coating composition which comprises (a) at least one fluorine containing thermosetting resin composition in which the fluorine atom content is at least about 10% by weight and (b) at least one granular compound of about 5 microns or less in mean particle size in an amount of about 40–200 parts by weight based on 100 parts by weight of said fluorine-containing thermosetting resin composition; and co-curing the topcoat and the undercoat.

The present invention further provides a substrate bearing a thermosetting undercoat and a topcoat co-cured with the undercoat, the topcoat comprising the cured reaction product of (a) at least one fluorine-containing thermosetting resin composition in which the fluorine atom content is at least about 10% by weight and (b) at least one granular compound of up to about 5 microns in mean particle size in an amount of about 40–200 parts by weight based on 100 parts by weight of the fluorine-containing thermosetting resin composition, the interface between the undercoat and the substrate being substantially free from chromate residue.

DETAILED DESCRIPTION OF THE INVENTION

The undercoat coating composition, the topcoat coating composition and the process for formation of a water repellent coating using these compositions according to the present invention are described below.

UNDERCOAT COATING COMPOSITION

The undercoat coating composition used in the present invention is at least one thermosetting coating composition which has a gel fraction as a coated film of about 20–80%. This gel fraction can be attained by partially crosslinking the composition, as by heating. This composition can be selected from a wide variety of organic compositions which comprise, as essential components, a backbone resin and a crosslinking agent.

The backbone resin used in these compositions has functional groups which can be reacted with the crosslinking agent. Representative functional groups include hydroxyl, isocyanate, amino, carboxyl, alkoxysilyl and epoxy. Representative backbone resins which can be used include acrylics, alkyds, polyesters, epoxies, silicones, polyurethanes, fluorine containing resins, polyamides, phenolic resins and the like. Among these, fluorine containing resins and phenolic resins are preferred.

The crosslinking agent is a component for three-dimensionally crosslinking the backbone resin by heating, and can include, for example, melamine resins, urea resins, guanamine resins, polyisocyanate compounds, hydroxyl containing compounds, poly(carboxylic acid) compounds and the like.

The ratio between the backbone resin and the crosslinking agent can be selected according to the purpose of the final product. For example, about from 50 to 95% by weight and, preferably about from 65 to 85% by weight, of the backbone resin and about from 50 to 5% by weight, especially about from 35 to 15% by weight, of the crosslinking agent are generally used on the basis of the combined weight of these two components.

The undercoat coating composition used in the present invention can be obtained either by dissolving or by dispersing the mixture of the backbone resin and the crosslinking agent into at least one organic solvent.

As required, the undercoat coating composition may optionally comprise curing catalyst, colored pigment, metallic pigment, extender pigment and the like. Furthermore, it should comprise at least one granular compound of up to about 5 microns in mean particle size in an amount of up to about 40% by weight, preferably up to about 15% by weight, based on 100 parts of the combined weight of the backbone resin and the crosslinking agent.

In the present invention, the undercoat is coated onto a suitable substrate, for example, an aluminum fin of a heat exchanger, such as is used for a domestic or a automobile air conditioner. The undercoat is applied to the substrate using conventional coating techniques. For example, it can be coated by dipping or shower coating to a cured film thickness of about from 0.5 to 20 microns, and preferably about from 1 to 10 microns.

In the present invention, prior to coating the water repellent topcoat coating composition onto the undercoat surface, it is necessary to partially crosslink the undercoat so that its gel fraction is about from 20 to 80%, and preferably about from 30 to 60%. If the gel fraction of the undercoat is lower than about 20%, undesired elution of the undercoat component by the organic solvent in the water repellent topcoat coating composition occurs, while a gel fraction of the undercoat higher than about 80% produces a composite film having inferior to adhesion between the undercoat and the topcoat after curing.

Furthermore, the use of a thermoelastic resin or a thermosetting resin having poor crosslinkability as the backbone resin of the undercoat also leads to the undesired elution of the undercoat component by the organic solvent in the water repellent topcoat coating composition.

In the present invention, the gel fraction of the undercoat can be determined as follows:

A cured film of the undercoat having film thickness of 10 to 20 microns is formed on a tinplate sheet, weighed, immersed with the sheet into acetone, and then boiled at reflux for 8 hours. After refluxing, the resulting film is dried and weighed. The gel fraction can be calculated from the following equation.

$$\text{Gel Fraction (\%)} = \frac{\text{Weight of the film after refluxing}}{\text{Initial weight of the film}} \times 100$$

TOPCOAT COATING COMPOSITION

The topcoat coating composition used in the present invention is a thermosetting coating composition which comprises at least one fluorine-containing thermosetting resin in which the fluorine atom content is at least about 10% by weight and at least one granular compound of up to about 5 microns in mean particle size.

The fluorine containing thermosetting resin composition comprises backbone resin and crosslinking agent. The backbone resin is a resin containing fluorine and hydroxyl group in the main and/or side chains of the molecule. The crosslinking agent is a component for three-dimensionally crosslinking the backbone resin and may include amino resins, polyisocyanate compounds (including blocked types) and the like.

Examples of the backbone resin include the following copolymer (1), copolymer (2) and the like.

Copolymer (1)

The copolymer (1) can be obtained by copolymerizing fluoroolefin (a) and vinylic monomer having hydroxyl functionality (b) and, as necessary, other copolymerizable monomer (c).

Examples of fluoroolefins (a) which can be used are hexafluoropropene, tetrafluoroethylene, monochlorotrifluoroethylene, dichlorodifluoroethylene, 1,2-difluoroethylene, vinylidene fluoride, monofluoroethylene and the like. Among them, vinylidene fluoride, tetrafluoroethylene, monofluorethylene, and monochlorotrifluoroethylene are especially desirable from the viewpoint of the copolymerizability.

The vinylic monomer having hydroxyl functionality (b) is a monomer containing at least one hydroxyl group and at least one unsaturated double bond which is copolymerizable with the fluoroolefin (a) in a molecule. Such monomers include, for example, hydroxy group containing vinyl ether such as hydroxyethyl vinyl ether, hydroxypropyl vinyl ether, hydroxybutyl vinyl ether, hydroxyhexyl vinyl ether, hydroxypentyl vinyl ether and the like; and hydroxyl group containing (meth) acrylates such as 2-hydroxyethyl (meth) acrylate, hydroxypropyl (meth) acrylate, hydroxybutyl (meth) acrylate and the like. Among them, hydroxyl group containing vinyl ethers, especially vinyl ether having $C_{2-6}$ hydroxyalkyl group, is preferable from the viewpoint of the copolymerizability with the fluoroolefin (a).

Other copolymerizable monomers (c) which can optionally be used in the copolymer (1) include, for example, alkyl or cycloalkyl vinyl ethers such as methyl vinyl ether, ethyl vinyl ether, propyl vinyl ether, n-butyl vinyl ether, isobutyl vinyl ether, hexyl vinyl ether, octyl vinyl ether, decyl vinyl ether, lauryl vinyl ether, cyclobutyl vinyl ether, cyclopentyl vinyl ether, cyclohexyl vinyl ether and the like; $C_{1-18}$ alkyl esters of (meth) acrylic acid; vinyl esters such as vinyl acetate, vinyl propionate, vinyl butyrate, vinyl caprate, vinyl laurate and the like.

The ratio of the components in copolymer (1) may be selected according to the fluorine content, the surface tension, and the chemical or physical properties desired in the cured coating. In general, the molar ratio of fluoroolefin (a): vinylic monomer having hydroxyl functionality (b): other copolymerizable monomer (c) is about 20–90: 1–80: 79–0.

The weight-average molecular weight of the copolymer (1) is about from 2,000 to 100,000 and preferably about from 5,000 to 60,000. If the molecular weight of the copolymer is lower than about 2,000, it results in a coating film inferior in water resistance or other physical properties, while a copolymer having a molecular weight higher than about 100,000 tends to yield highly viscous solutions when dissolved in an organic solvent, making application to a substrate difficult. The hydroxyl value of copolymer (1) is about from 20 to 400 mg KOH/g, and preferably about from 40 to 300 mg KOH/g. If the hydroxyl value is lower than about 20 mg KOH/g, it results in a coating film of insufficient crosslinking, while a copolymer having a hydroxyl value of higher than about 400 mg KOH/g produces a coating film inferior in water resistance or physical properties.

The copolymerication reaction for preparing the copolymer (1) can be conducted in the presence of a polymerization catalyst. Generally, the amount of catalyst used is about from 0.01 to 5 parts by weight based on 100 parts by weight of the total monomers, at a temperature of –20° to 150° C., at a pressure of atmospheric to 30 kg/cm$^2$G, and in the presence of an organic solvent by a per se known process.

Copolymer (2)

Copolymer (2) can be obtained by copolymerizing fluoroalkyl (meth) acrylate (d) and vinylic monomer having hydroxyl functionality (e) and, as necessary, other copolymerizable monomer (f).

Examples of the fluoroalkyl (meth) acrylate (d) which can be used include 2,2-difluoroethyl (meth) acrylate, 2,2,2-trifluoroethyl (meth) acrylate, 2,2,3,3-tetrafluoropropyl (meth) acrylate, 2,2,3,3,3-pentafluoropropyl (meth) acrylate, 2,2,3,3,4,4-hexafluorobutyl (meth) acrylate, 2,2,3,3,4,4,5,5-octafluoropentyl (meth) acrylate, 1,1-di(trifluoromethyl) 2,2,2-trifluoroethyl (meth) acrylate, 2,2,3,3,4,4,5,5,6,6,7,7-dodecafluoropentyl (meth) acrylate, 3,3,4,4,5,5,6,6,7,7,8,8,9,9,10,10,10-heptadecafluorodecanyl (meth) acrylate and the like.

The vinylic monomer having hydroxyl functionality (e) is at least one monomer containing both hydroxyl groups and unsaturated double bond functionality which is copolymerizable with the fluoroalkyl (meth) acrylate (d) in a molecule and can include, for example, 2-hydroxyethyl (meth) acrylate, hydroxypropyl (meth) acrylate, hydroxybutyl (meth) acrylate and the like.

Examples of the other copolymerizable monomer (f) include alkyl ($C_{1-10}$) (meth) acrylate, alkoxyl ($C_{1-6}$) (meth)

acrylate, cyanoethyl (meth) acrylate, acrylamide, (meth) acrylic acid, styrene, alkyl-substituted styrene, (meth) acrylonitrile and the like.

The ratio of the components in copolymer (2) may be selected according to the fluorine content, the surface tension, and the chemical or physical properties desired in the cured coating. In general, the molar ratio of fluoroalkyl (meth) acrylate (d): vinylic monomer having hydroxyl functionality (e): other copolymerizable monomer (f) is about 20–80: 1–80: 79–0. The weight-average molecular weight and the hydroxyl value of the copolymer (2) and the copolymerization reaction for preparing the copolymer (2) are the same as those mentioned in the copolymer (1).

An amino resin and/or a polyisocyanate compound can be used as a crosslinking agent for the above-mentioned fluorine containing backbone resin having hydroxyl functionality in the present invention.

The amino resin can be obtained by condensing or co-condensing melamine, benzo guanamine, aceto guanamine, spiro guanamine, steroguanamine, dicyandiamide or the like with aldehyde such as formaldehyde, paraformaldehyde, acetaldehyde, benzaldehyde or the like, and, if desired, further etherifying the product with alcohol such as methyl alcohol, ethyl alcohol, n-propyl alcohol, isopropyl alcohol, n-butyl alcohol, isobutyl alcohol, 2-ethylbutanol, 2-ethylhexanol or the like. These amino resins are commercially available under the tradename of "Cymel 303" (a fully methoxylated melamine resin, Mitsui Cyanamid Co., Ltd.), "Uban 20SE-60" (a butoxylated melamine resin, Mitsui Toatsu Chemical Co., Ltd.), "Nicalac MS-95" (methoxylated/butoxylated melamine resin, Sanwa Chemical Co., Ltd.) and the like.

The amount of the amino resin used is generally about from 10 to 100 parts by weight, preferably about from 20 to 70 parts by weight, per 100 parts of the fluorine containing backbone resin having hydroxyl functionality on the solid weight basis. The use of less than about 10 parts and more than about 100 parts of the amino resin leads to a cured coating inferior in crosslinkability or physical properties.

Polyisocyanate compounds can be used as the crosslinking agent. Examples of polyisocyanate compounds which can be so used include aliphatic diisocyanates such as hexamethylene diisocyanate and trimethylhexamethylene diisocyanate; alicyclic diisocyanates such as isophorone diisocyanate; aromatic diisocyanates such as tolylenediisocyanate, xylylene diisocyante and 4,4'-diphenylmethanediisocyanate; adducts obtained by reacting these polyisocyanates with active hydrogen-containing compounds such as water, ethylene glycol, propylene glycol, 1,4-butylene glycol, trimethylolpropane, pentaerythritol, polyester resin having low molecular weight such that the isocyanate groups are excessive with respect to the above hydrogens; bullet-type adducts of polyisocyanates; and isocyanurate ring-type adducts of polyisocyanates.

These polyisocyanate compounds may be blocked with blocking agents. A storage stable one-package water repellent coating composition can be obtained by using such a blocked polyisocyanate compound. Examples of these blocking agents are active hydrogen-containing compounds having low molecular weight and low volatility such as aliphatic or aromatic monoalcohols, tert-amines having hydroxyl functionality, oximes, active methylene-containing compounds, lactams, phenolic compounds and the like.

The OH/NCO equivalent ratio between the fluorine containing backbone resin having hydroxyl functionality and the polyisocyanate compound is about from 0.5 to 2.5, and preferably about from 0.7 to 2.0.

A self-crosslinkable resin which can be obtained by copolymerizing N-methylolacrylamide or N-n-butoxymethylacrylamide with the above-mentioned monomers is also useful as the fluorine containing thermosetting resin without combination with the crosslinking agent.

In the present invention, the fluorine atom content is based on either the total amount by weight of the fluorine containing backbone resin having hydroxyl functionality and the crosslinking agent in case of the backbone resin/crosslinking agent system or the weight of the self-crosslinkable resin itself in case of not using the crosslinking agent.

The fluorine atom content in the fluorine containing thermosetting resin is up to about 10% by weight, and preferably up to about 15% by weight, resulting in a cured coating having a repellent surface on which the contact angle of water droplet is at least about 95 degrees, and preferably about from 98 to 110 degrees.

The granular compound in combination with the fluorine containing thermosetting resin composition in the present invention is a granular compound of up to about 5 microns, preferably up to about 3 microns, and more preferably up to about 1 micron or less, in mean particle size. Although either an organic or a inorganic fine particle can be used, it is necessary that the particle exist in a granular state in the film after curing.

Examples of granular compounds which can be used include silica, fluorocarbon, carbon black and the like. Among these silica is preferred, an especially silica fine particles, the surface of which is hydrophobically treated by silazane, $(CH_3)_3$—Si—NH—Si—$(CH_3)_3$. The use of a spherical silica fine particle produces an especially smooth-surfaced coating film. When the mean particle size of the granular compound is more than about 5 microns, the water repellency of the coating film tends to decrease because the roughness of the surface of the coating film increases microscopically.

In the topcoat coating compositions of the present invention, the specific amount of the granular compound to the fluorine containing thermosetting resin composition is not critical, but generally, it is about from 40 to 200 parts by weight, and preferably about from 60 to 150 parts by weight, per 100 solid parts of the fluorine containing thermosetting resin composition. This range provides excellent water repellency and physical properties of the cured coating film.

The use of the granular compound of up to about 5 microns in mean particle size in combination with the fluorine containing thermosetting resin composition having specific range of fluorine atom content leads to a cured coating having a repellent surface on which the contact angle of water droplet is at least about 140 degrees.

As required, the topcoat coating composition of this invention may contain at least one additive in amounts normally used, such as organic solvents; organic or inorganic colored pigments; and defoamers. These components can be incorporated into the composition by any appropriate method, for example, using a dissolver, steel ball mill, pebble mill, sand mill, attritor or the like.

The process of this invention can be applied to a wide variety of substrates such as metal, plastics or glass. For example, an aluminum fin of a heat exchanger for a domestic or an automobile air conditioner can be coated using the present invention.

The substrate to be coated is preferably degreased and washed by water before use. The process of this invention can be conducted by coating the undercoat composition to the substrate mentioned above, partially crosslinking the undercoat by heating so that the gel fraction of the undercoat film is about from 20 to 80%, preferably about from 30 to 60%, by dipping or shower coating to a cured film thickness of about from 0.5 to 20 microns, preferably about from 1 to 10 microns; coating the topcoat coating composition onto the partially cured undercoat surface by dipping or shower coating to a cured film thickness of about from 0.5 to 20 microns, preferably about from 1 to 10 microns; and then substantially completely curing both undercoat film and topcoat coating composition simultaneously by heating so that the gel fraction of the composite film is at least about 90%, and preferably is at least about 95%.

When a non-blocked polyisocyanate compound is used as the crosslinking agent for the topcoat coating composition, the topcoat composition is a two-package system in which the crosslinking agent is separate from the fluorine containing backbone resin having hydroxyl functionality. The backbone resin and the crosslinking agent are mixed well just before use, coated, and cured at a temperature of about from room temperature to 140° C. On the other hand, when a blocked polyisocyanate compound or an amino resin is used as the crosslinking agent or when a self-crosslinkable resin is used as the thermosetting resin, the topcoat coating composition is a one-package system and the cured coating film can be obtained by baking the composition for about from 3 to 20 minutes at a temperature of about from 120° to 200° C.

The composite cured coating according to the present invention has a water repellent surface on which the contact angle of water droplets is at least about 140 degrees. As the cured coating shows excellent adhesion and corrosion resistance, it is possible to eliminate a treatment for anti-corrosion such as the chromate treatment. Chromate treatment is essential in previous hydrophilic treatment, and suitable for reducing the coating process, lowering air pollution and protecting the environment. Furthermore, since according to the present invention, as the coating has an excellent heat curability in which the gel fraction of the cured coating is at least about 90%, a durable water repellent and odorless cured coatings can be obtained without impairing the characteristics of the film arising from the elution of the composition into the water and without emitting a foul odor from the film. Both of these problems are generally observed with the previous hydrophilic films. There is no formation of water bridges between the fins; nor does water stay in the form of droplets on the surface of the cured coating. As a result, heat exchangers coated according to the present invention maintain excellent cooling efficiency and performance. Further, aluminum fins coated according to the present invention exhibit excellent water repellency and corrosion resistance, and also show improved fungus resistance. At the same time, these benefits are attained without the undesirable odor associated with previous hydrophillic films. Thus, the instant process for the formation of water repellent coatings can improve the energy efficiency of heat exchangers and conserve resources without the generation of undesired odors.

The coatings prepared according to the present invention exhibit excellent adhesion to the substrate. While this benefit is not fully understood, it is believed to be due to the mutual migration of both the topcoat and the undercoat at the interface during curing, resulting in a composite coating having excellent mechanical strength and adhesion to the substrate.

The following Examples and Comparative Examples specifically illustrate the present invention. All parts and percentages in these examples are by weight.

PREPARATION OF SAMPLES

1. Preparation of Undercoat Paint (A-1)

In a 1-liter glass-lined autoclave, 20 parts of hydroxypropyl vinyl ether, 64.3 parts of xylene, 21.4 parts of methyl isobutyl ketone and 0.36 parts of N,N-dimethylbenzylamine were charged, followed by replacing the inner space with a nitrogen gas and further by addition of 80 parts of vinylidene fluoride. The mixture was heated to a temperature of 65° C. The initial pressure in the autoclave was 6.2 $kg/cm^2$ G. Subsequently, the polymerization was started by adding 14.3 parts of a solution of 0.9 parts of azobisisobutyronitrile into xylene/methyl isobutyl ketone (3/1 by weight) into the autoclave at 65° C. The mixture was kept at 65° C. for 20 hours with stirring. The pressure in the autoclave after 20 hours was 0.2 $kg/cm^2$ G. The resulting mixture was then cooled to obtain a solution of fluorine containing resin having hydroxyl functionality (F-1) having a solid content of about 50%. The resin (solid content) had a hydroxyl value of about 110 mg KOH/g, a weight-average molecular weight of 15,000 and a fluorine atom content of 47%.

96 parts of Desmodur BL3175 (nonvolatile content 75%, a product of Sumitomo Bayer Urethane Co., methyl ethyl ketoxime-blocked adduct-type hexamethylene diisocyanate, isocyanate group content 11.5%) was added to 200 parts of the above solution (F-1) (the OH/NCO equivalent ratio=1.0) with stirring and diluted with the mixture of organic solvents (toluene/butyl acetate/ethylene glycol monomethyl ether acetate=3/1/1) to obtain an undercoat paint (A-1) having a solids content of 15%.

2. Preparation of Undercoat Paint (A-2)

40 parts of Nicalac MS-95 (nonvolatile content 95%, a product of Sanwa Chemical Co., methoxylated/isobutoxylated melamine resin) and 1.5 parts of Nacure 5225 (a product of King Industries Co., amine-blocked dodecylbenzenesulfonic acid) were added to 200 parts of the solution of fluorine containing resin having hydroxyl functionality (F-1) with stirring and diluted with the mixture of organic solvents (toluene/butyl acetate/ethylene glycol monomethyl ether acetate=3/1/1) to obtain an undercoat paint (A-2) having a solids content of 15%.

Preparation of Undercoat Paint (A-3)

200 parts of AS-1303 (a product of Mitsubishi Rayon Co., fluorine containing acrylic copolymer having hydroxyl functionality, fluorine atom content 30%, hydroxyl value 52, weight-average molecular weight about 30,000, nonvolatile content 50%) and 70 parts of Takenate B-815N (a product of Takeda Chemical Co., methyl ethyl ketoxime-blocked isophorone diisocyanate, isocyanate group content 12.6%, nonvolatile content 60%) were mixed and diluted with the mixture of organic solvents used in the preparation of the undercoat paint (A-2) to obtain an undercoat paint (A-3) having a solids content of 15%.

4. Preparation of Undercoat Paint (A-4)

200 parts of AS-1303 and 10 parts of CAB-O-SIL TS-530 (a product of Cabot Co., hydrophobically treated silica fine particle of 0.1 microns in mean particle size) were mixed followed by dispersing by means of a shaker and further by diluting with the mixture of organic solvents used in the preparation of the undercoat paint (A-2) to obtain an undercoat paint (A-4) having a solids content of 15%.

5. Preparation of Undercoat Paint (A-5)

200 parts of AS-6612 (a product of Mitsubishi Rayon Co., self-crosslinkable fluorine containing acrylic copolymer obtained by copolymerizing N-n-butoxymethylacrylamide as a functional monomer, fluorine atom content 30%, nonvolatile content 50%) and 10 parts of CAB-O-SIL were mixed followed by dispersing by means of a shaker and further by diluting with the mixture of organic solvents used in the preparation of the undercoat paint (A-2) to obtain an undercoat paint (A-5) having a solids content of 15%.

6. Preparation of Undercoat Paint (A-6)

270 parts of Epon #1010 (a product of Yuka-Shell Co., epoxy resin, cyclohexane/Suwasol #1500 (1/1 by weight) solution, nonvolatile content 30%) and 34 parts of Super-beckamine P-196M (a product of Dainippon Ink Co., urea resin, nonvolatile content 60%) were mixed and diluted with cyclohexanone/Suwasol #1500 (1/1 by weight) solvent to obtain an undercoat paint (A-6) having a solids content of 15%.

7. Preparation of Topcoat Paint (B-1)

200 parts of AS-1303, 80 parts of Takenate B-815N and 18 parts of CAB-O-SIL TS-530 were mixed followed by dispersing by means of a shaker and further by diluting with the mixture of organic solvents used in the preparation of the undercoat paint (A-2) to a solids content of 15%.

8. Preparation of Topcoat Paints (B-2) to (B-4)

Topcoat paints were prepared according to the same procedure and formulation as in the preparation of (B-1) except that the charged contents of CAB-O-SIL TS-530 were changed to 100 parts, 180 parts, and 310 parts for B-2, B-3 and B-4, respectively.

9. Preparation Of Topcoat Paint (B-5)

200 parts of AS-6612 and 100 parts of CAB-O-SIL TS-530 were mixed followed by dispersing by means of a shaker and further by diluting with the mixture of organic solvents used in the preparation of the undercoat paint (A-2) to obtain a topcoat paint (B-5) having a solids content of 15%.

EXAMPLES 1 TO 10 AND COMPARATIVE EXAMPLES A TO H

EXAMPLE 1

An aluminum plate, A-1050, with the thickness of 0.8 mm was degreased with Chemicleaner 561B (a product of Japan CB Chemical Co., alkaline degreasing agent), washed with deionized water and dried. The undercoat paint (A-1) was coated on the aluminum plate by dipping, to provide a film thickness of 10 to 12 microns (after curing) and cured by heating at 140° C. for 10 minutes. Then topcoat paint B-2 was coated thereon by dipping, to provide a film thickness of 2 to 3 microns (after curing) and cured by heating at 170° C. for 30 minutes. The performance of the films was tested, and the results are summarized in Table 1.

EXAMPLES 2 TO 10 AND COMPARATIVE EXAMPLES A TO H

The general procedure of Example 1 was repeated, except that the compositions of the undercoat and the topcoat and the curing conditions shown in Table 1 were used. Table 1 also shows the results obtained from the performance tests of the films, together with other results as explained below:

Initial contact angle of water droplet: About 0.03 cc of deionized water was dropped to the surface of the test panel just after curing. Then, the contact angle of the water droplet was measured using CONTACT ANGLE METER DCAA, (TM) equipment commercially available from Kyowa Kagaku Co.

Contact angle of water droplet after immersion: The test panel was immersed into a stream of city water for 120 hours and washed with city water followed by standing for 24 hours in 75% RH at 20° C. Then, about 0.03 cc of deionized water was dropped onto the surface of said panel. The contact angles of the water droplets were measured by a CONTACT ANGLE METER DCAA.

Sliding angle of water droplet: About 0.03 cc of deionized water was dropped to the surface of the test panel by a syringe. Then, the panel was inclined slowly to measure the angle of inclination which the water droplet on the surface of the panel began to slide according to the following criteria:

a: Inclination angle less than 20 degrees b: Inclination angle of 20 to 40 degrees c: Inclination angle of 40 to 60 degrees d: Inclination angle more than 60 degrees Adhesiveness: The cured test panel was tested for adhesiveness using an adhesive cellophane tape for peeling to evaluate according to the following criteria:

a: No peeling b: Slight degree of peeling c: Remarkable degree of peeling

Corrosion resistance (resistance to salt spray): A Salt spray test of the cured test panel was conducted according to the manner described in JIS Z-2871. After 480 hours, the panel was tested for adhesiveness using an adhesive cellophane tape for peeling to evaluate according to the following criteria:

a: No peeling b: Slight degree of peeling c: Remarkable degree of peeling

The test results summarized in the Table confirm the excellent performance characteristics of the present invention, including excellent resistance to corrosion, despite the absence of the use of chromate or like material as a corrosion inhibitor.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| UNDERCOAT | | | | | | | | | | |
| Kind of composition | A-1 | A-2 | A-3 | A-3 | A-4 | A-4 | A-4 | A-5 | A-5 | A-6 |
| Curing condition | | | | | | | | | | |
| Temp. (°C.) | 140 | 140 | 150 | 180 | 160 | 160 | 160 | 100 | 160 | 160 |

TABLE 1-continued

| | | | | | | | | | | |
|---|---|---|---|---|---|---|---|---|---|---|
| Time (min.) | 10 | 10 | 10 | 5 | 10 | 10 | 10 | 10 | 5 | 10 |
| Gel fraction (%) | 30 | 60 | 40 | 60 | 50 | 50 | 50 | 30 | 60 | 60 |
| TOPCOAT | | | | | | | | | | |
| Kind of composition | B-2 | B-2 | B-2 | B-2 | B-2 | B-3 | B-5 | B-2 | B-5 | B-2 |
| Curing condition | | | | | | | | | | |
| Temp. (°C.) | 170 | 170 | 170 | 170 | 170 | 170 | 180 | 170 | 180 | 170 |
| Time (min.) | 30 | 30 | 30 | 30 | 30 | 30 | 30 | 30 | 30 | 30 |
| TEST ITEMS | | | | | | | | | | |
| Initial contact angle of water droplet | 152 | 152 | 151 | 153 | 150 | 153 | 153 | 152 | 150 | 151 |
| Contact angle of water droplet after immersion | 140 | 139 | 140 | 138 | 139 | 140 | 139 | 138 | 141 | 141 |
| Sliding angle of water droplet | a | a | a | a | a | a | a | a | a | a |
| Adhesiveness | a | a | a | a | a | a | a | a | a | a |
| Corrosion resistance | a | a | a | a | a | a | a | a | a | a |

| | Comparative Examples | | | | | | | |
|---|---|---|---|---|---|---|---|---|
| | A | B | C | D | E | F | G | H |
| UNDERCOAT | | | | | | | | |
| Kind of composition | A-1 | — | — | A-3 | A-3 | A-4 | A-4 | A-4 |
| Curing condition | | | | | | | | |
| Temp. (°C.) | 140 | — | — | 150 | 180 | 60 | 180 | 180 |
| Time (min.) | 10 | — | — | 10 | 30 | 10 | 30 | 30 |
| Gel fraction (%) | 30 | — | — | 40 | 92 | 15 | 93 | 93 |
| TOPCOAT | | | | | | | | |
| Kind of composition | B-1 | B-2 | B-5 | B-4 | B-2 | B-2 | B-2 | B-5 |
| Curing condition | | | | | | | | |
| Temp. (°C.) | 170 | 170 | 180 | 170 | 170 | 170 | 170 | 180 |
| Time (min.) | 30 | 30 | 30 | 30 | 30 | 30 | 30 | 30 |
| TEST ITEMS | | | | | | | | |
| Initial contact angle of water droplet | 90 | 152 | 153 | 152 | 153 | 152 | 150 | 151 |
| Contact angle of water droplet after immersion | 87 | 130 | 115 | 143 | 143 | 143 | 141 | 141 |
| Sliding angle of water droplet | c | a | a | a | a | a | a | a |
| Adhesiveness | a | c | c | c | c | c | c | c |
| Corrosion resistance | c | c | c | c | c | c | c | c |

We claim:

1. A process for formation of a water repellent coating which comprises applying a thermosetting undercoat to a metal substrate; curing the undercoat to a gel fraction of about 20–80%; applying to the undercoat a topcoat coating composition which comprises (a) at least one fluorine-containing thermosetting resin composition in which the fluorine atom content is at least about 10% by weight and (b) at least one granular compound of about 5 microns or less in mean particle size in an amount of about 40–200 parts by weight based on 100 parts by weight of said fluorine-containing thermosetting resin composition; and co-curing the topcoat and the undercoat.

2. A process according to claim 1 wherein the fluorine containing thermosetting resin composition is the copolymerized reaction product of fluoroolefin and vinylic monomer having hydroxyl functionality and, as necessary, other copolymerizable monomer.

3. A process according to claim 1 wherein the fluorine-containing thermosetting resin composition is the copolymerized reaction product of fluoroalkyl (meth) acrylate and vinylic monomer having hydroxyl functionality and, as necessary, other copolymerizable monomer.

4. A process according to claim 1 wherein the granular compound in the topcoat coating composition is selected from the group consisting of silica fine particle, fluorocarbon fine particle and carbon black.

5. A process according to claim 1 wherein the mean particle size of the granular compound in the topcoat coating composition is up to about 3 microns or less.

6. A process according to claim 1 wherein an aluminum fin of a heat exchanger is coated by dipping or shower coating, and wherein the nonvolatile contents of the undercoat and topcoat compositions are adjusted to about from 2 to 20% by weight.

7. A metal substrate bearing a thermosetting undercoat and a topcoat co-cured with the undercoat, the topcoat comprising the cured reaction product of (a) at least one fluorine-containing thermosetting resin composition in which the fluorine atom content is at least about 10% by weight and (b) at least one granular compound of up to about 5 microns in mean particle size in an amount of about 40–200 parts by weight based on 100 parts by weight of the fluorine containing thermosetting resin composition, the interface between the undercoat and the substrate being substantially free from chromate residue.

8. A coated substrate of claim 7 wherein the fluorine containing thermosetting resin composition is the copolymerized reaction product of fluoroolefin and vinylic monomer having hydroxyl functionality and, as necessary, other copolymerizable monomer.

9. A coated substrate of claim 7 wherein the fluorine-containing thermosetting resin composition is the copolymerized reaction product of fluoroalkyl (meth) acrylate and a vinylic monomer having hydroxyl functionality and, as necessary, other copolymerizable monomer.

10. A coated substrate of claim 7 wherein the granular compound in the topcoat coating composition is selected from the group consisting of silica fine particle, fluorocarbon fine particle and carbon black.

11. A coated substrate of claim 7 wherein the mean particle size of the granular compound in the topcoat coating composition is up to about 3 microns.

12. A coated substrate of claim 7 wherein an aluminum fin of a heat exchanger is coated by dipping or shower coating, and wherein the nonvolatile contents of the undercoat and topcoat compositions are adjusted to about from 2 to 20% by weight.

* * * * *